United States Patent
Gonzalez-Pelayo et al.

(10) Patent No.: US 11,486,746 B2
(45) Date of Patent: Nov. 1, 2022

(54) MAGNETIC-INDUCTIVE FLOWMETER AND MAGNETIC CIRCUIT DEVICE

(71) Applicant: KROHNE AG, Basel (CH)

(72) Inventors: Juan Carlos Gonzalez-Pelayo, TX Meteren (NL); Christian Paul, Rotterdam (NL); Joseph Neven, Romans (FR)

(73) Assignee: KROHNE AG, Basel (CH)

( * ) Notice: Subject to any disclaimer, the term of this patent is extended or adjusted under 35 U.S.C. 154(b) by 302 days.

(21) Appl. No.: 17/008,842

(22) Filed: Sep. 1, 2020

(65) Prior Publication Data

US 2021/0063216 A1 Mar. 4, 2021

(30) Foreign Application Priority Data

Sep. 3, 2019 (DE) ...................... 10 2019 123 528.6

(51) Int. Cl.
*G01F 1/58* (2006.01)
*G01F 1/60* (2006.01)

(52) U.S. Cl.
CPC .............. *G01F 1/584* (2013.01); *G01F 1/588* (2013.01); *G01F 1/60* (2013.01)

(58) Field of Classification Search
None
See application file for complete search history.

(56) References Cited

U.S. PATENT DOCUMENTS

| | | | |
|---|---|---|---|
| 9,121,739 B2 | 9/2015 | van Willingen et al. | |
| 9,689,725 B2 | 6/2017 | Beerling et al. | |
| 9,709,426 B2 | 7/2017 | Beerling et al. | |
| 9,766,104 B2 * | 9/2017 | Perfetti | G01F 15/14 |
| 2021/0372835 A1 * | 12/2021 | Neven | G01F 1/588 |

FOREIGN PATENT DOCUMENTS

| | | |
|---|---|---|
| CN | 206300690 U | 7/2017 |
| DE | 2263717 A1 | 7/1974 |
| DE | 2401811 A1 | 7/1975 |
| DE | 202017006709 U1 | 2/2018 |
| DE | 102017131202 A1 | 6/2019 |
| WO | 2019121107 A1 | 6/2019 |

* cited by examiner

*Primary Examiner* — Harshad R Patel
(74) *Attorney, Agent, or Firm* — David S. Safran; Calderon Safran & Cole P.C.

(57) ABSTRACT

A magnetic-inductive flowmeter with a measuring tube for guiding an electrically conductive medium, a magnetic circuit device running outside the measuring tube for generating and guiding a magnetic field through the measuring tube, and two electrodes for tapping a measuring voltage induced in the medium. The magnetic circuit device has at least a first coil for generating the magnetic field and first and second pole piece plates, the magnetic field being formed between the pole piece plates, wherein the measuring tube is arranged between the two pole piece plates and wherein the electrodes are arranged on opposite sides of the measuring tube, an imaginary connecting line between the two electrodes running perpendicular to the direction of flow and perpendicular to the direction of the magnetic field. The magnetic field is fed into the pole piece plates by at least two feed-in regions per pole piece plate.

17 Claims, 8 Drawing Sheets

MAGNETIC-INDUCTIVE FLOWMETER AND MAGNETIC CIRCUIT DEVICE

BACKGROUND OF THE INVENTION

Field of the Invention

The invention relates to a magnetic-inductive flowmeter, with a measuring tube for guiding an electrically conductive medium, with a magnetic circuit device running outside the measuring tube for generating and guiding a magnetic field passing through the measuring tube at least partially perpendicular to the direction of flow of the medium, and with two electrodes for tapping a measuring voltage induced in the medium, wherein the magnetic circuit device has at least a first coil for generating the magnetic field and a first pole piece plate and a second pole piece plate, wherein the magnetic field is formed between the pole piece plates, wherein the measuring tube is arranged between the two pole piece plates and wherein the electrodes are arranged on opposite sides of the measuring tube and an imaginary connecting line between the two electrodes runs perpendicular to the direction of flow and perpendicular to the direction of the magnetic field.

Description of the Related Art

The magnetic-inductive flowmeters being discussed here are known in variety from the state of the art and are used to determine the flow of a medium. The measuring principle underlying the flow measurement is based on the principle of charge separation of particles in a magnetic field. The charge separation leads to an induced voltage—the measuring voltage—which is proportional to the flow velocity of the charge carriers moving in the medium, so that the flow rate in the measuring tube can be deduced from the flow velocity. The principle of charge separation assumes that the direction of flow of the medium in the measuring tube and the orientation of the magnetic field penetrating the medium are not oriented in the same way. Although a perpendicular orientation of the measuring tube and the magnetic field is desirable, since the effect of charge separation is greatest in this case, it is not absolutely necessary. If it is said that the magnetic circuit device generates a magnetic field that penetrates the measuring tube at least partially perpendicular to the direction of flow, then it is understood that the magnetic field penetrates the measuring tube "essentially perpendicularly", however at least one component of the magnetic field penetrates the measuring tube perpendicularly to the direction of flow.

Magnetic circuit devices have at least one coil that generates the magnetic field. The magnetic field generated is usually guided to the pole pieces via elements guiding the magnetic field. The pole pieces serve to allow the magnetic field lines of the magnetic field to exit the magnetic circuit in a defined manner; the space between the pole pieces is penetrated by the magnetic field. In magnetic-inductive flowmeters, the pole pieces are preferably implemented by pole piece plates which are relatively thin, so that in the following we will refer to pole piece plates. However, the invention is also transferable to other forms of pole pieces.

A magnetic-inductive flowmeter is known from German Patent Application DE 102012014266 A1 and corresponding U.S. Pat. No. 9,121,739 B2. In addition to the two pole piece plates, the magnetic circuit device of the magnetic-inductive flowmeter described here comprises a total of four coils that generate the magnetic field. Two coils each are arranged on opposite sides of the measuring tube and pole piece plates. The two coils on each side are arranged in series with each other, with an electrode between the two coils. The coils are connected by one yoke element each to one another other on the one hand and to one pole piece plate each on the other hand, so that altogether a closed magnetic circuit device is implemented. The magnetic field generated in the coils, or the magnetic field lines of the magnetic field, is fed into the pole piece plates via the yoke elements centrally on the side of the pole piece plates facing the coils.

Since the measuring accuracy of the magnetic-inductive flowmeter depends on the magnetic field strength of the magnetic field generated on the one hand and on the homogeneity of the magnetic field generated on the other hand, it is a constant endeavor to further optimize the homogeneity of the magnetic field in order to achieve better measuring results. The external dimensions of a magnetic-inductive flowmeter are also of relevance in practice; the aim here is to make the measuring devices themselves as compact as possible so that they can be used in the most space-saving manner possible.

SUMMARY OF THE INVENTION

Accordingly, the object of the invention is to provide a magnetic-inductive flowmeter that is characterized by an improved measuring sensitivity.

The above-described and derived object is achieved by the magnetic-inductive flowmeter described in the introduction in that that each pole piece plate has a first side facing the first coil and a second side opposite the first side and that, in order to feed the magnetic field into the pole piece plates, at least two feed-in regions per pole piece plate are formed on the first sides of the pole piece plates.

According to the invention, it was initially recognized that the homogeneity of the magnetic field formed between the pole piece plates is substantially dependent on the feeding of the magnetic field into the pole piece plates, namely in particular on the number of feed-in regions via which the magnetic field, or the magnetic field lines of the magnetic field generated by the coil, is introduced into the pole piece plates. The magnetic field generated by the coil is therefore—in contrast to the state of the art—fed into the pole piece plates via at least two feed-in regions on the first sides of the pole piece plates. In the state of the art, each side has only one feed-in region.

A feed-in region is understood to be the region where the magnetic field lines are introduced into the pole piece plates. The feed-in region is thus the region where the pole piece plates are in contact with or connected to other magnetic field conducting or magnetic field generating elements of the magnetic circuit device. That the at least two feed-in regions are formed on one side and also on the same side of the pole piece plates improves the homogeneity of the magnetic field between the pole piece plates. An improved homogeneity of the magnetic field results in an improved measuring sensitivity of the magnetic-inductive flowmeter.

A design of this type has proved to be particularly advantageous, in which the feed-in regions are formed close to the edges, namely in the outer quarter of the longitudinal extension of the first side of the pole piece plates. This not only results in an advantageous distribution of the magnetic field between the pole piece plates, but also offers constructional advantages, which will be discussed in more detail below.

The feed-in regions can be implemented in various constructive ways. In a preferred design of the magnetic-inductive flowmeter, the coil is arranged on the side of an electrode. In one design, a coil is used to generate the magnetic field. The coil is connected to the first side of the first pole piece plate via an essentially Y-shaped yoke element and to the first side of the second pole piece plate via another essentially Y-shaped yoke element. Here the Y-arms of the yoke elements are connected to the pole piece plates so that two feed-in regions are formed on each of the first sides of the pole piece plates. When we talk about Y-shaped yoke elements, we mean all designs in which the yoke element is divided into two parts. For example, a Y-shaped yoke element also includes one in which the Y trunk passes straight into the first Y arm, whereas the second Y arm itself is right-angled and also branches off from the Y trunk at a right angle. For example, the yoke element could be correspondingly H-shaped. Preferably, both Y-shaped yoke elements are constructed in the same manner.

A further, particularly preferred design of the magnetic-inductive flowmeter is characterized in that the magnetic circuit device has a second coil, so that the magnetic field passing through the measuring tube is generated by two coils. The second coil is arranged in a preferred configuration on the side of the pole piece plates opposite the first coil, so that the second sides of the pole piece plates face the second coil. To feed the magnetic field into the pole piece plates, at least two further feed-in regions per pole piece plate are formed on the second sides of the pole piece plates. This is preferably achieved by also connecting the second coil to the first side of the first pole piece plate via a first Y-shaped yoke element and to the first side of the second pole piece plate via a second Y-shaped yoke element. The feed-in regions on the second side of the pole piece plates are also preferably formed in the outer quarter of the longitudinal extension of the second sides of the pole piece plates. In total, the magnetic circuit device thus has two coils and at least four feed-in regions per pole piece plate, wherein two feed-in regions are formed on the first sides of the pole piece plates and two feed-in regions are formed on the second sides of the pole piece plates.

In a further preferred design of the magnetic-inductive flowmeter according to the invention, the magnetic circuit device also has two coils. However, unlike the design described above, the second coil is located on the same side of the pole piece plates as the first coil. Preferably, the two coils are arranged one behind the other, seen in the direction of flow, and more preferably the electrode is arranged between the coils. Each of the two coils feeds the magnetic field into the pole piece plates via at least one feed-in region, so that a total of at least two feed-in regions are implemented.

In a further design of the magnetic-inductive flowmeter according to the invention, the magnetic circuit device has four coils, so that the magnetic field passing through the measuring tube is generated by four coils. Here, two coils are arranged on each side of the measuring tube, namely on each side of one electrode. The two coils are preferably arranged one behind the other on each side, seen in the direction of flow. The electrode is also preferably arranged between the two coils, i.e. behind the first coil and in front of the second coil when viewed in the direction of flow.

In this design, it is further provided that each coil is at least indirectly connected via a feed-in region to the first pole piece plate and via a feed-in region to the second pole piece plate. In the case of the total of four coils, at least two feed-in regions are thus formed on the first sides of the pole piece plates and at least two feed-in regions are likewise formed on the second sides of the pole piece plates.

Because the feed-in regions are preferably formed in the outer regions of the first and second sides of the pole piece plates, and the coils are arranged next to the electrode—i.e. in front of and behind the electrode as viewed in the direction of flow—the advantage is that a lot of installation space is available for the coils, and the coils can be formed so that they extend from the first pole piece plate to the second pole piece plate.

In a preferred design of the magnetic-inductive flowmeter, the coils are therefore designed as long coils. A long coil is understood to be a coil whose length is considerably greater than its diameter. In particular, such coils are preferred where the length of the coil is at least ten times the diameter. In particular, the ratio of the length of the coil to its diameter, at which one speaks of a long coil, depends on the nominal diameter of the respective coil. For nominal widths DN 150, a long coil is considered to be a long coil if the length of the coil is at least ten times the diameter. For nominal widths DN 600 and larger, a long coil is considered to be a long coil if the length of the coil is at least 20 times the diameter. Long coils have the advantage over short coils, whose length is of the same order of magnitude as the coil radius, that the magnetic field inside the coil is homogeneous, or significantly more homogeneous than the magnetic field inside a short coil. In addition, long coils have significantly lower unwanted stray fields, which means that the susceptibility to stray fields can be reduced by using long coils. Due to the significantly lower stray fields, shielding measures for shielding the stray fields can be simplified or the use of shielding measures for shielding the stray fields can be dispensed with. The design according to the invention thus differs substantially from the magnetic-inductive flowmeter of the state of the art as described in the introduction of the description, in which the coils are arranged between the electrode and the pole piece plate and are thus designed to fit the limited space. Long coils also have the advantage that they can be manufactured in a material-saving manner.

With the preferred design of the magnetic-inductive flowmeter described above, it is also possible to connect the coils to the pole piece plates via yoke elements, in particular also via Y-shaped yoke elements. When using Y-shaped yoke elements, more than two feed-in regions per side of a pole piece plate can then be implemented in a simple manner.

It is advantageous to design a magnetic circuit device of a magnetic-inductive flowmeter as simply as possible, in particular to minimize the number of components used as far as possible, in order to further increase the homogeneity of the magnetic field, since disturbing vortex fields can be generated by connecting sections or connection points between two components. In a further design of the magnetic-inductive flowmeter, the coils are directly connected to the pole piece plates. When it is discussed that the coil is directly connected to the pole piece plates, it is meant that no separate yoke elements are used. This allows the number of connection points in the magnetic circuit device to be reduced. It is preferable that the coils each have a coil core and that the coil core is connected to the pole piece plates. The coil core is understood here to be the section surrounded by the windings of the coil, wherein the coil core can also extend insignificantly beyond the windings of the coil. The length of the extension of the coil core beyond the windings is preferably less than one tenth of the length of the section of the coil core surrounded by the windings. In particular, the length should only be selected to such an extent that a connection with the pole piece plates is possible in a straight line.

In a particularly preferred design, the coil core has a recess into which the pole piece plate is inserted. It is advantageous that the recess has a slot-like design, wherein the width of the slot-like recess preferably corresponds essentially to the thickness of the pole piece plate, so that the pole piece plate can be inserted into the slot-like recess. The pole piece plate is preferably bent at its first side.

In a further design, the coils are arc-shaped, in particular circular. The bending radius of the coils corresponds particularly preferably to the outer radius of the measuring tube, so that the coils can be arranged on the measuring tube to save space.

It is known from the state of the art to design measuring tubes in such a way that they have a measuring section with an essentially rectangular cross-section—perpendicular to the direction of flow—, wherein the measuring section of the measuring tube is the area of the measuring tube through which the magnetic field passes. If an essentially rectangular cross-section is being discussed, then the measuring tubes are usually implemented in such a way that the long sides of the rectangular cross-section are arranged parallel to one another, wherein the short sides of the cross-section do not necessarily have to be straight. Rather, the short sides are usually circular. In such a measuring tube, the electrodes are arranged on the short sides of the measuring section. Furthermore, in flowmeters with such a measuring tube, the pole piece plates are arranged on the long sides of the measuring section, i.e., on the long sides of the rectangular cross-section. One design of the magnetic-inductive flowmeter according to the invention is characterized in that the magnetic-inductive flowmeter has a measuring tube with a substantially rectangular measuring tube cross-section, wherein the pole piece plates are arranged on the long sides of the measuring section. To mechanically reinforce the measuring section, reinforcing ribs are formed in the measuring section. The reinforcing ribs are preferably formed on the long sides of the measuring section. According to the invention, recesses corresponding to the reinforcing ribs are formed in the pole piece plates, which are arranged on the two longitudinal sides of the measuring section, in particular resting on the measuring sections, for receiving the reinforcing ribs. In this manner, it is possible to arrange the pole piece plates as close as possible to the measuring tube, wherein the distance between the two pole piece plates can be minimized Depending on the design of the reinforcing ribs and the corresponding recesses in the pole piece plates, the reinforcing ribs can have a fixing function for the pole piece plates.

In a further design, it is provided that the measuring tube has positioning elements and that positioning recesses for the positioning elements are formed in the pole piece plates. In contrast to the reinforcing ribs, the positioning elements do not have a reinforcing function for the measuring tube or the measuring section, but are used to position the magnetic circuit device and in particular to fix the pole piece plates.

The formation of recesses in the pole piece plates also reduces stray fields and eddy currents in the pole piece plates. This further increases the homogeneity of the magnetic field. In addition, due to the lower stray fields and eddy currents, a faster switching of the magnetic field is possible.

The magnetic-inductive flowmeter has a particularly preferred design in that the first pole piece plate and the second pole piece plate are each made up of a first pole piece plate section and a second pole piece plate section. The first pole piece plate section of the first pole piece plate and the first pole piece plate section of the second pole piece plate are connected to each other via elements of the magnetic circuit device guiding the magnetic field, in particular by one or more coils and/or one or more yoke elements guiding the magnetic field, likewise the second pole piece plate section of the first pole piece plate and the second pole piece plate section of the second pole piece plate are connected to each other via elements of the magnetic circuit device guiding the magnetic field, in particular by one or more coils and/or one or more yoke elements guiding the magnetic field, so that the magnetic circuit device is constructed in two parts overall. This design has the particular advantage that mounting the magnetic-inductive flowmeter is considerably simplified. The two parts of the magnetic circuit device can be prefabricated and then simply plugged onto the measuring tube of the magnetic-inductive flowmeter. If the pole piece plate section also have the positioning recesses described above, the positioning elements can reach through the positioning recesses after the parts of the magnetic circuit device have been plugged in, so that the two parts of the magnetic circuit device are fixed to the measuring tube.

The two-part design of the pole piece plates further prevents the formation of stray fields and eddy currents.

In one, a design in which the magnetic circuit device has four coils, the respective pole piece plate sections are connected to one another, for example, by two coils each. The second pole piece plate section of the first pole piece plate and the second pole piece plate section of the second pole piece plate are then also connected to each other via two coils.

The invention relates not only to a magnetic-inductive flowmeter, but also to a magnetic circuit device for a magnetic-inductive flowmeter. The magnetic circuit device according to the invention serves to generate and guide a magnetic field and has at least a first coil for generating the magnetic field and a first pole piece plate and a second pole piece plate, wherein the magnetic field is formed between the pole piece plates. A measuring tube of a magnetic-inductive flowmeter can be arranged between the pole piece plates, so that in the operating state this measuring tube would be permeated by the magnetic field.

The magnetic circuit device according to the invention is characterized in that each pole piece plate has a first side facing the first coil and a second side opposite the first side, and that for feeding the magnetic field into the pole piece plates at least two feed-in points per pole piece plate are formed on the first sides of the pole piece plates.

The magnetic circuit device according to the invention can be designed in particular according to any one of the features characterizing the magnetic circuit device of the magnetic circuit device described above of the magnetic-inductive flowmeter according to the invention. Accordingly, all designs made in connection with the magnetic circuit device of the magnetic-inductive flowmeter according to the invention with respect to different configurations with their advantages apply accordingly to the magnetic circuit device according to the invention.

In detail, there is now a plurality of possibilities for designing and further developing the magnetic-inductive flowmeter and the magnetic circuit device according to the invention. Reference is made to the description of preferred embodiments in connection with the accompanying drawings.

DETAILED DESCRIPTION OF THE DRAWINGS

Figure 1:
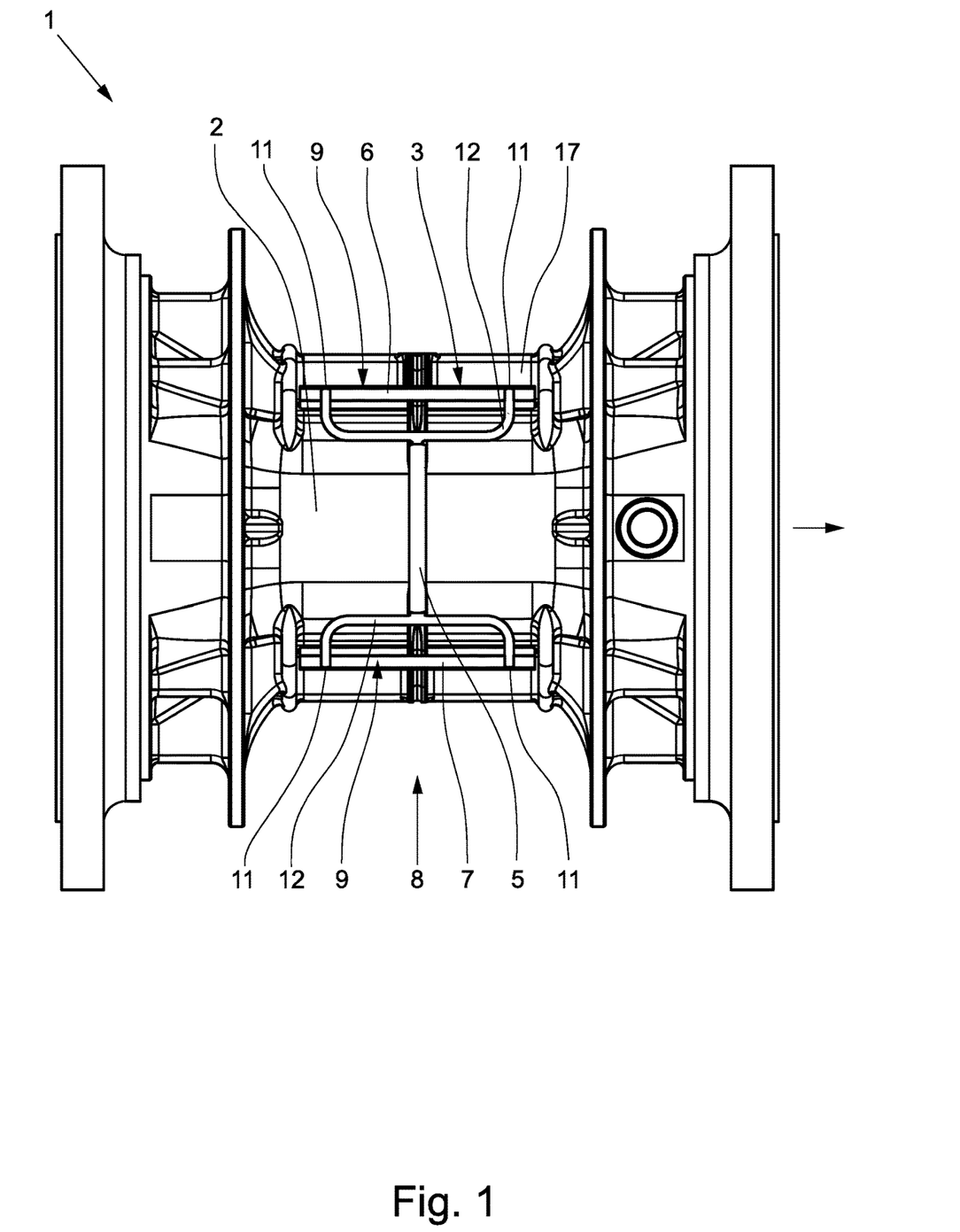
FIG. 1 shows a first embodiment of a magnetic-inductive flowmeter with a first embodiment of a magnetic circuit device.

FIG. 1 shows a magnetic-inductive flowmeter 1 with a measuring tube 2, wherein the measuring tube 2 is used to guide an electrically conductive medium. The magnetic-inductive flowmeter 1 has a magnetic circuit device 3 running outside the measuring tube 2 for generating and guiding a magnetic field passing through the measuring tube 2 at least partially perpendicular to the direction of flow of the medium. The flow direction of the medium is indicated by the arrow. In addition, the magnetic-inductive flowmeter 1 has two electrodes 4 which are used to tap a measuring voltage induced in the medium. The electrodes 4 are not visible in FIG. 1. The magnetic circuit device 3 also has a coil 5 for generating the magnetic field and a first pole piece plate 6 and a second pole piece plate 7, wherein a measuring section 8 of the measuring tube 2 is arranged between the two opposing pole piece plates 6, 7. The magnetic field that passes through the measuring tube 2 is formed between the pole piece plates 6, 7. The two electrodes 4 are also arranged on opposite sides of the measuring tube 2, wherein an imaginary connecting line, which is not shown, runs between the two electrodes 4 perpendicular to the direction of flow and perpendicular to the direction of the magnetic field.

The two pole piece plates 6, 7 are designed in such that they have a first side 9 and a second side 10, wherein the first sides 9 of the pole piece plates 6, 7 face the coil 5 and the second sides 10 are opposite the first sides 9, thus are located on the side of the pole piece plates 6, 7 facing away from the coil 5. To feed the magnetic field generated in the coil 5 into the pole piece plates 6, 7, two feed-in regions 11 per pole piece plate 6, 7 are formed on the first sides 9 of the two pole piece plates 6, 7. The feed-in regions 11 are each located in the outer quarter of the longitudinal extension of the first sides 9 of the pole piece plates 6, 7. The feed-in regions 11 are thus formed in the peripheral region of the pole piece plates 6, 7. This design of the magnetic circuit device 3 ensures that a homogeneous magnetic field is formed between the two pole piece plates 6, 7. In order to feed the magnetic field generated in the coil 5 into the pole piece plates 6, 7, the coil 5 is connected to both the first pole piece plate 6 and the second pole piece plate 7 via a Y-shaped yoke element 12 in each case.

Figure 2:
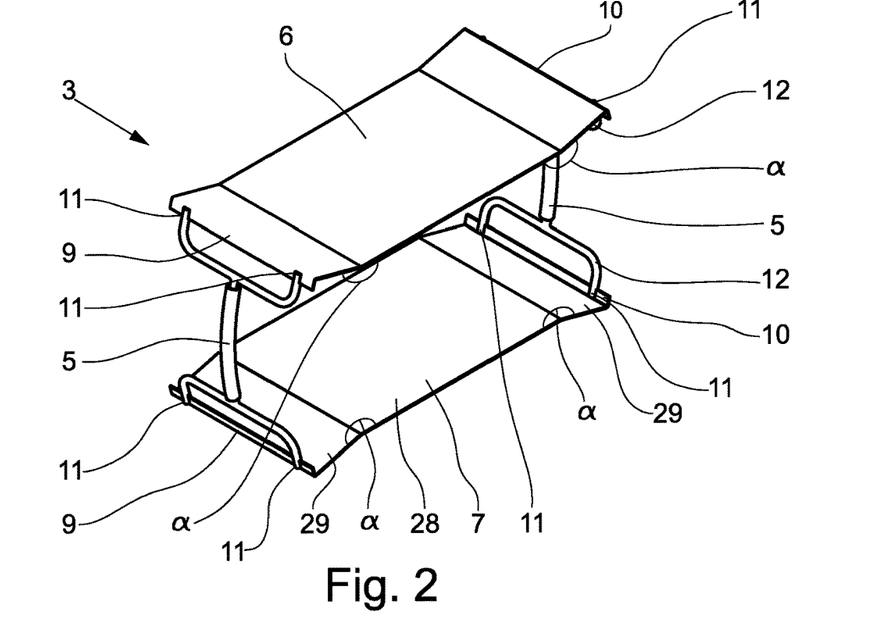
FIG. 2 shows a second embodiment of a magnetic circuit device.

FIG. 2 shows a further configuration of a magnetic circuit device 3. In the embodiment shown, the magnetic circuit device has two coils 5, so that the magnetic field passing through the measuring tube 2 is generated by two coils 5.

The second coil 5 is arranged on the side of the pole piece plates 6, 7 opposite the first coil 5, so that the second sides 10 of the pole piece plates 6, 7 face the second coil 5. To feed the magnetic field generated by the second coil 5, two further feed-in regions 11 per pole piece plate 6, 7 are formed on the second sides 10 of the pole piece plates 6, 7. A total of two coils 5 are used to generate the magnetic field, with a total of four feed-in regions 11 per pole piece plate 6, 7. The second coil 5 is also connected to the pole piece plates 6, 7 via a Y-shaped yoke element 12 at each of the feed-in regions 11. The coils 5 are designed as long coils.

In the embodiment of the magnetic circuit device 3 shown in FIGS. 1 and 2, the coil 5, or coils 5, is or are arranged in the immediate vicinity of the electrodes 4, namely at the same level as the electrodes 4 when viewed in the direction of flow. Due to the immediate proximity of the coils 5 to the electrodes 4, the stray fields of the coils 5 can influence the electrodes 4 during operation of the magnetic-inductive flowmeter 1. Such an influence can be minimized by placing a shielding metal housing around the coils 5. The metal housing is preferably designed in such that it absorbs the undesired stray fields and couples them into the pole piece plates 6, 7. The metal housing is not shown in the figures.

Figure 3:
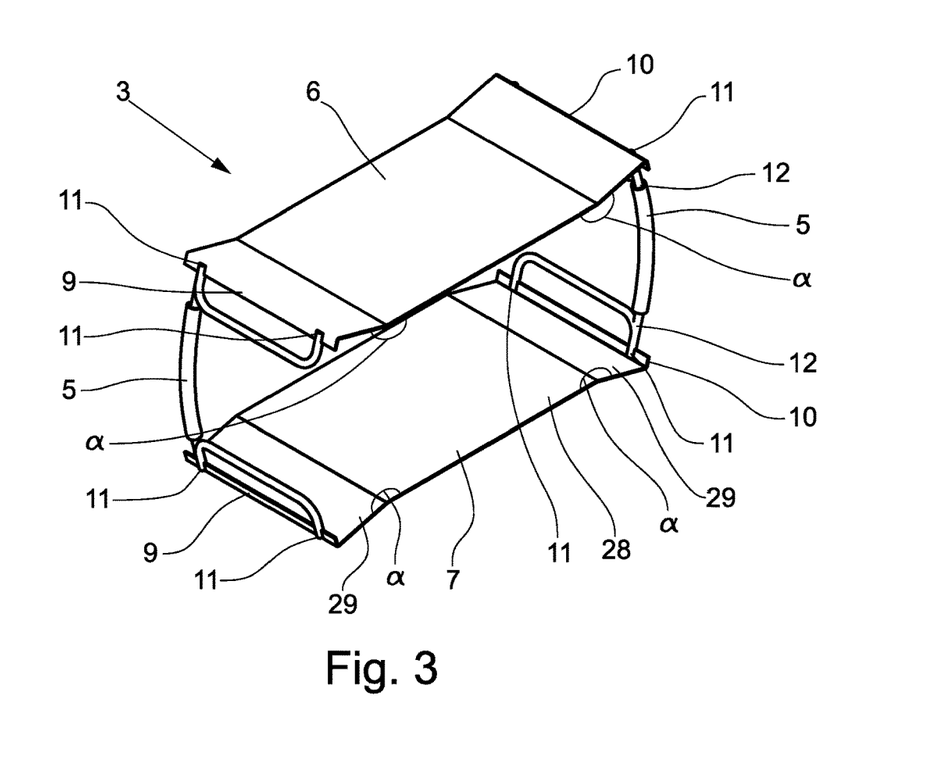
FIG. 3 shows a third embodiment of a magnetic circuit device.

FIG. 3 shows a further embodiment of a magnetic circuit device 3 with two coils 5. In contrast to the embodiment shown in FIG. 2, the two coils 5 are not arranged in the middle of the second side 9 of the pole piece plates 6, 7, but—seen in the direction of flow—are arranged at a level with a feed point 11. This arrangement of the coils 5 has the advantage that the influence of the coils 5 on the electrodes 4 is minimized because the distance between electrodes 4 and coils 5 is increased.

Electrode 4 and coil 5 are arranged one behind the other in the flow direction and not at the same height. The yoke elements 12 have an H-shaped configuration.

Figure 4:
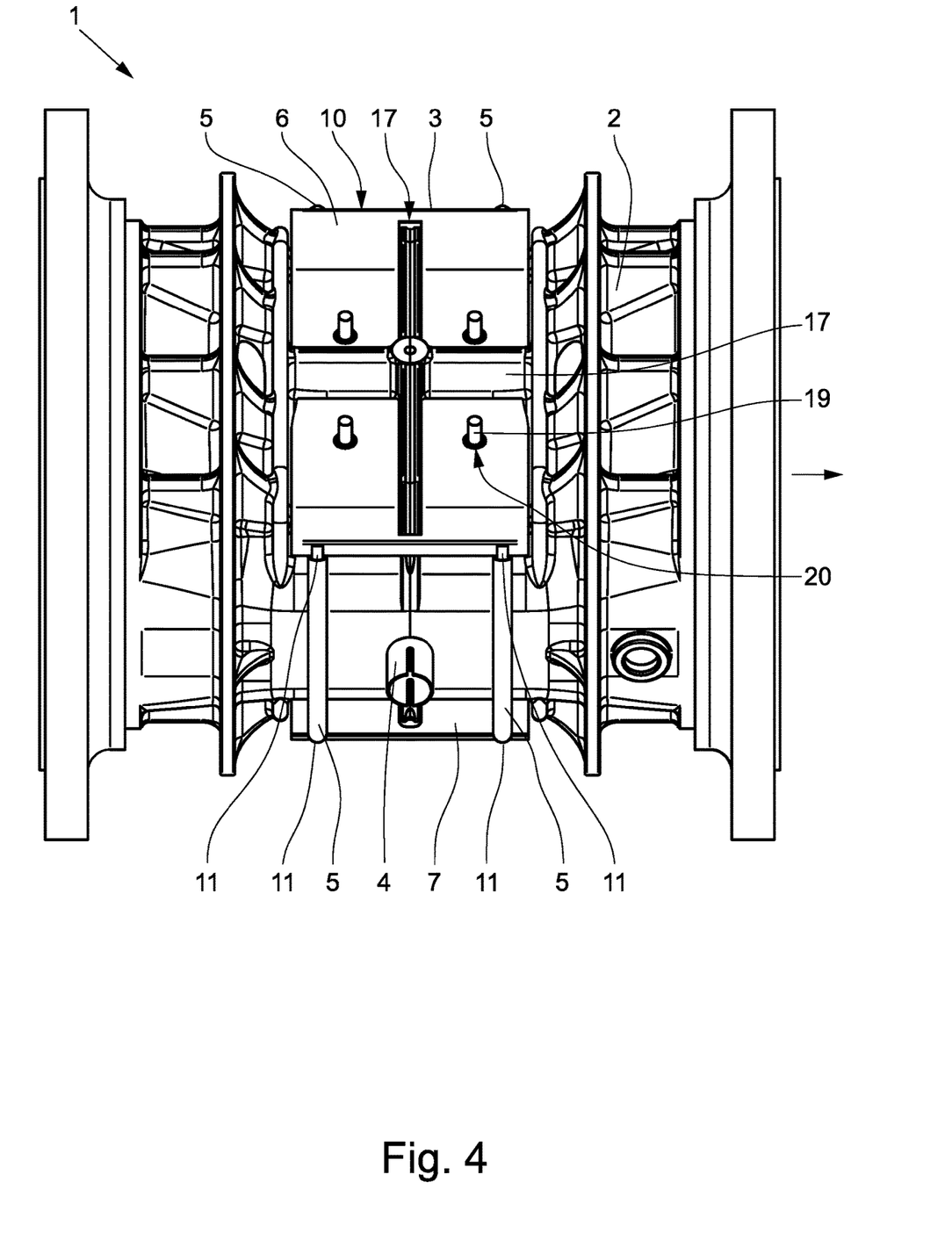
FIG. 4 shows a magnetic-inductive flowmeter with a fourth embodiment of a magnetic circuit device.

FIG. 4 shows a further embodiment of a magnetic-inductive flowmeter 1, wherein the magnetic-inductive flowmeter 1 has a measuring tube 2 and a magnetic circuit device 3. Electrodes 4 are also provided for tapping the measuring voltage. The magnetic circuit device 3 is particularly easy to see in the perspective shown. The magnetic circuit device 3 has a total of four coils 5, which are designed to generate the magnetic field. Two of the coils 5 are arranged on the first side 9 of the pole piece plates 6, 7, the other two coils 5 are arranged on the second side 10 of the pole piece plates 6, 7. Both coils 5 on each side of the pole piece plates 6, 7 are arranged one behind the other and parallel to each other, seen in the direction of flow. The electrode 4, or the electrodes 4, are arranged on each side between the two coils 5, i.e., they are arranged behind the first coil 5 and in front of the second coil 5, viewed in the direction of flow, wherein preferably and shown here, the coils 5 are arranged at the same distance from the electrode. Each of the coils 5 is connected to the pole piece plates 6, 7 via a feed-in region 11. Each of the coils 5 is therefore connected via a feed-in region 11 to the first pole piece plate 6 and via a further feed-in region 11 to the second pole piece plate 7. Not shown, but nevertheless covered by the invention, is that each of the four coils 5 is connected to the pole piece plates 6, 7 via more than one feed-in region 11. This can be achieved, for example, by using Y-shaped yoke elements—as shown in FIGS. 1 to 3.

As can be seen in the figures, the coils 5 are designed as long coils. A long coil is characterized in that the length l of the coil corresponds to a multiple of the diameter of the coil, namely in particular that the length l of the coil corresponds to at least ten times the diameter. This results in a homogeneous magnetic field inside the coil. Furthermore, significantly lower undesirable stray fields occur, which has a positive effect on the failure susceptibility and increases energy efficiency. Furthermore, the use of long coils means that shielding measures for stray fields can be dispensed with or these shielding measures can be significantly simplified.

Figure 5:
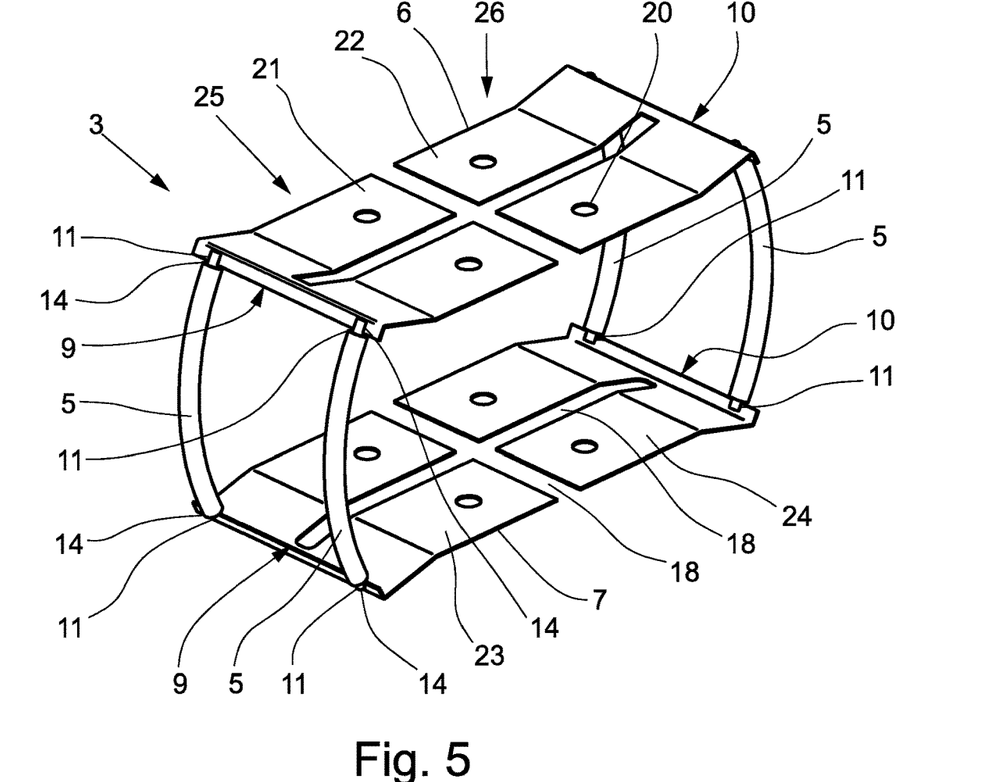
FIG. 5 shows the magnetic circuit device from FIG. 4 in a first perspective view.
Figure 7:
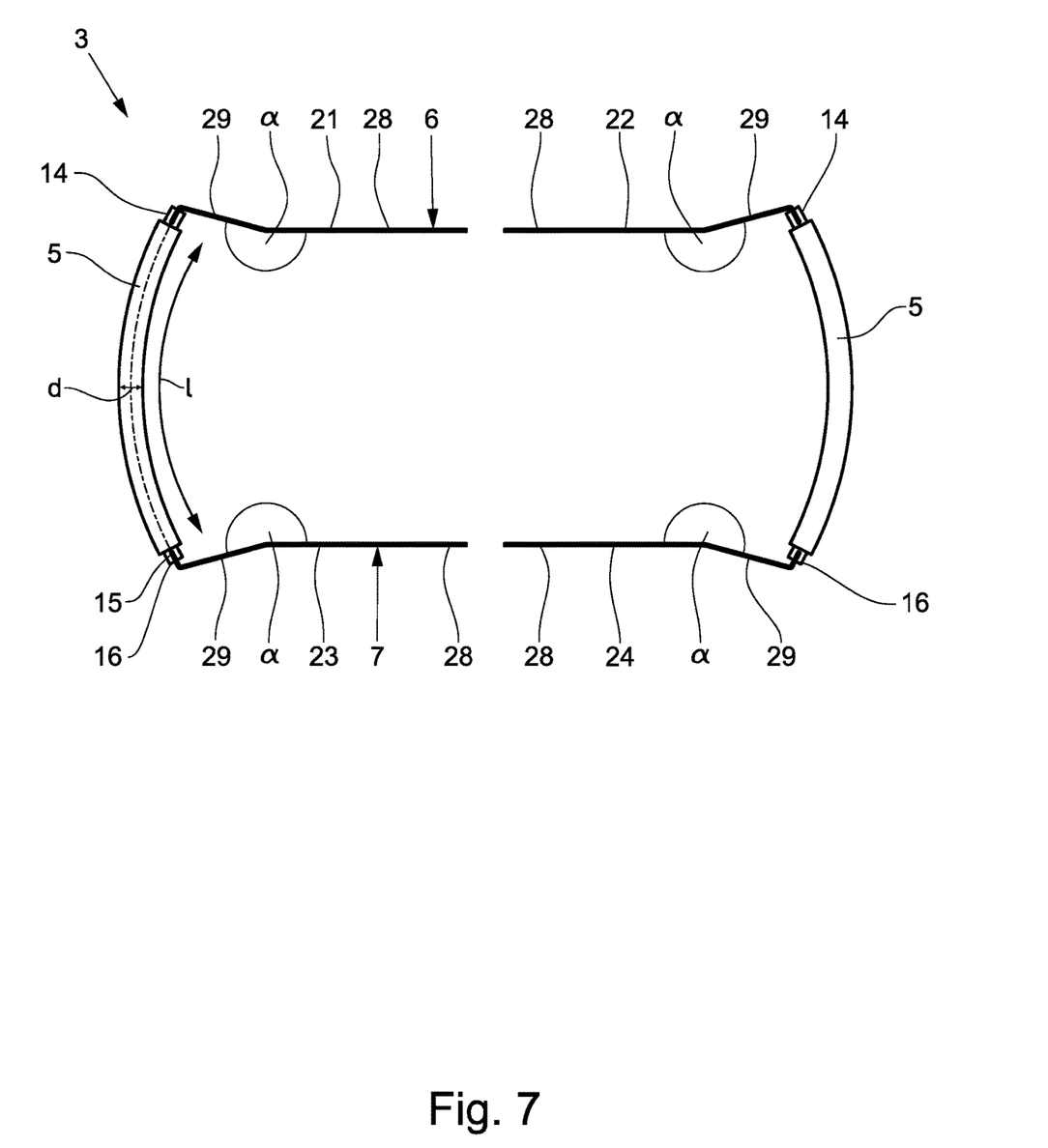
FIG. 7 is a third perspective view of the magnetic circuit device from FIG. 4.

As can also be seen in particular in FIGS. 5 and 7, the coils 5 are configured in the shape of a circular arc. The radius of the circular arc is adapted to the measuring tube geometry, namely to the outer radius of the arc-shaped area of the measuring section 8 of the measuring tube 2, so that the coils 5 can be arranged closely to the measuring tube 2, so that altogether a magnetic circuit device 3 can be formed, which is very closely connected to the measuring section 8 of the measuring tube 2. In this manner, compact magnetic-inductive flowmeters 1 can be easily formed. The coils 5 have a coil core 14 which is essentially enclosed by the windings of the coils 5 and an insignificant part of which protrudes beyond the windings of the coil. The projecting part of the coil core 14 is clearly visible in FIG. 7. In order to reduce the number of connection points in the magnetic circuit device 3 and thus potential sources of eddy fields or stray magnetic fields, the coil core 14 is directly connected to the pole piece plates 6, 7 in the design shown. For this purpose, the coil cores 14 each have recesses 15 at their ends, which are slot-shaped and into which the pole piece plates 6, 7 are inserted. The pole piece plates 6, 7 thus have a connecting section 16 which is connected to the coil cores 14. In the embodiment shown, the connecting section 16 of the pole piece plates 6, 7 is bent.

To reinforce the measuring section 8, reinforcing ribs 17 are formed on the measuring tube 2 in the area of the measuring section 8. The pole piece plates 6, 7 of the magnetic circuit device 3 have corresponding recesses 18 to accommodate the reinforcing ribs 17. These recesses 18 for the reinforcing ribs can be seen particularly clearly in FIG. 5 and FIG. 6, in which the magnetic circuit device 3 shown in FIG. 4 is shown in further perspective views. By forming recesses 18 for the reinforcing ribs 17, it can be ensured that the pole piece plates 6, 7 are arranged very close to the measuring section 8 and thus close to each other, so that the homogeneity of the magnetic field forming between the pole piece plates 6, 7 is improved. In addition, the formation of stray fields and eddy currents is reduced by the recesses 18, so that the homogeneity of the magnetic field forming between the pole piece plates 6, 7 is further improved.

Positioning elements 19 are provided for fixing and positioning the magnetic circuit device 3 on the measuring tube 2, as shown in FIG. 4 in particular. A total of four positioning elements 19 are provided on each side, namely per pole piece plate 6, 7. The pole piece plates 6, 7 have corresponding positioning recesses 20, through which the positioning elements 19 are guided. The formation of stray fields and eddy currents is also reduced by the formation of the positioning recesses 20.

Figure 6:
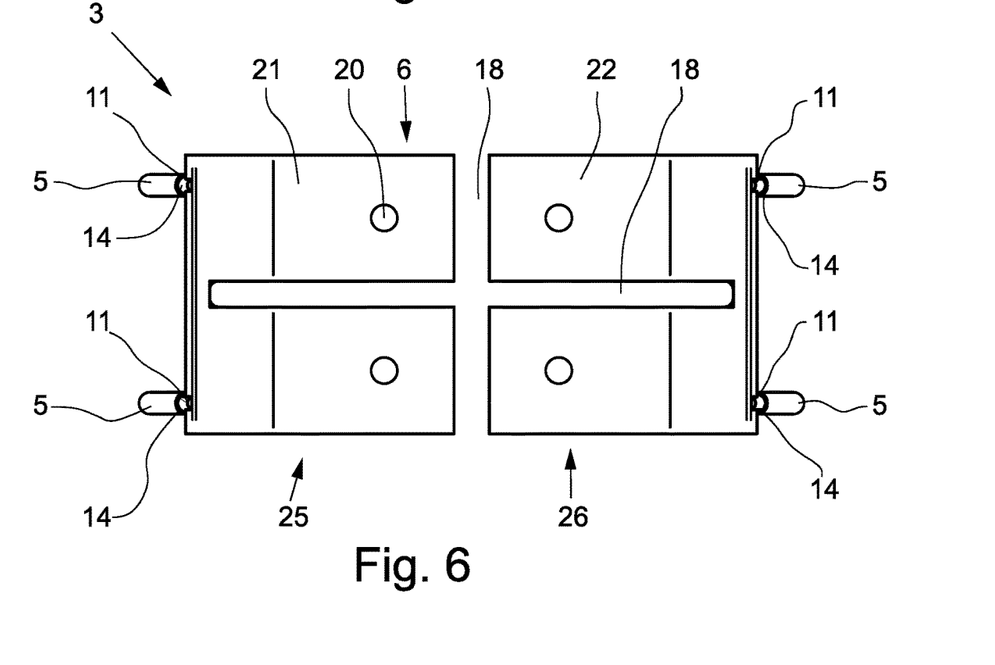
FIG. 6 is the magnetic circuit device from FIG. 4 in a second perspective view.

Such an embodiment is particularly advantageous in which the pole piece plates 6, 7 are constructed in two parts, namely where the first pole piece plate 6 has a first pole piece plate section 21 and a second pole piece plate section 22 and where the second pole piece plate 7 has a first pole piece plate section 23 and a second pole piece plate section 24. The first pole piece plate section 21 of the first pole piece plate 6 is connected via the coils 5 to the first pole piece plate section 23 of the second pole piece plate 7. The second pole piece plate section 22 of the first pole piece plate 6 is connected via the other two coils 5 to the second pole piece plate section 24 of the second pole piece plate 7. In total, the entire magnetic circuit device 3 is thus made up of two parts, i.e. a first part 25 and a second part 26, which are not connected to each other. This design has the advantage that the assembly of the magnetic circuit device is considerably simplified. The two parts 25, 26 can, for example, be plugged onto the measuring section 8 of the measuring tube 2. After attaching the two parts 25, 26, the positioning elements 19 can then be connected to the measuring tube 2 through the positioning recesses 20. Alternatively, the positioning elements 19 can be connected to the measuring tube 2 or made in one piece with the measuring tube 2 and the parts 25, 26 can be locked with the positioning elements 19 when plugged onto the measuring section 8 of the measuring tube 2. In this manner, the two parts 25, 26 of the magnetic circuit device 3 are fixed to the measuring tube 2 and can no longer perform any significant relative movements to the measuring tube 2. The dichotomy of the magnetic circuit device 3 can be seen very clearly in FIGS. 5 and 6 in particular. FIG. 5 shows a perspective view of the magnetic circuit device 3, FIG. 6 shows a top view of the magnetic circuit device 3.

Figure 8:
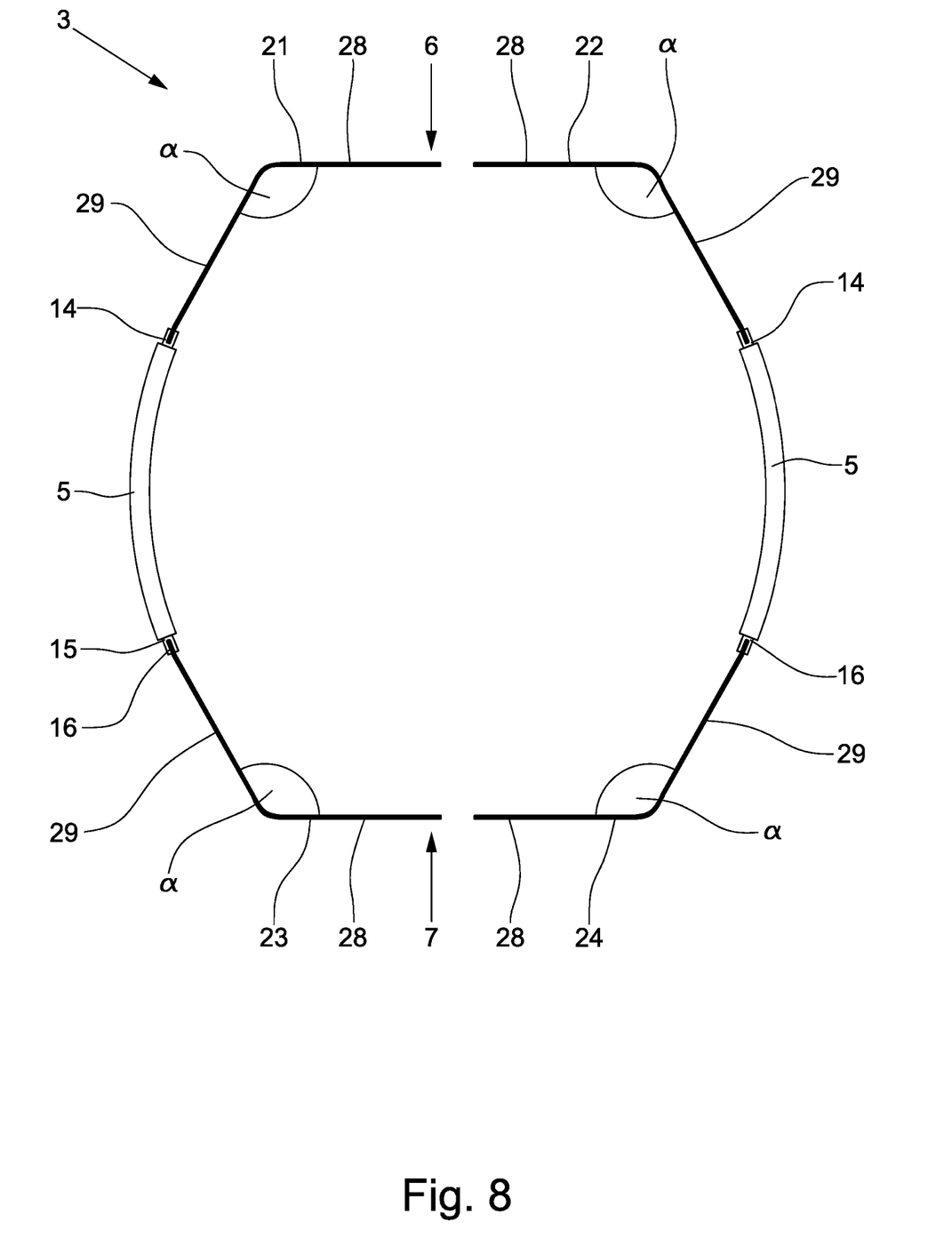
FIG. 8 shows a fifth embodiment of a magnetic circuit device.

Magnetic-inductive flowmeters 1 can have measuring tubes 2 with measuring sections of different geometries. The measuring section 8 of measuring tube 2 shown in FIGS. 1 and 4 is rectangular, i.e., it has a rectangular flow cross-section. In particular, it has two flat sides on which the pole piece plates are arranged. In another embodiment, the measuring section 8 of the measuring tube 2 has a round flow cross-section. FIG. 7 shows a magnetic circuit device 3, which is advantageously designed for the use of a measuring tube 2 with a measuring section 8 with a rectangular flow cross-section, whereas FIG. 8 shows a magnetic circuit device 3, which is advantageously designed for the use of a measuring tube 2 with a measuring section 8 with a round flow cross-section.

In both designs, the pole piece plate sections 21, 22, 23, 24 are each divided into a first section 28 and a second section 29. The first section 28 and the second section 29 are arranged at an internal angle α relative to each other. The internal angle α is the angle between the first section 28 and the second section 29 on the side of the pole piece plate sections 21, 22, 23, 24 facing the measuring tube 2 arranged between the pole piece plates 6, 7. The internal angle α is preferably implemented by bending the first section 28 away from the second section 29. In the magnetic circuit device 3 shown in FIG. 7, the internal angles α are greater than 180°. This results in an approximately rectangular shape of the magnetic circuit device 3. In the magnetic circuit device 3 shown in FIG. 8, the internal angles α are smaller than 180°. This results in an approximately round shape of the magnetic circuit device 3.

The magnetic circuit devices 3 shown in FIGS. 2 and 3 also have an internal angle α greater than 180° between the first section 28 and the second section 29. Since the pole piece plates 6,7 are made in one piece, a pole piece plate 6,7 here has a first section 28 and two second sections 29 which are adjacent to the first section 28 on both sides. The magnetic circuit devices 3 shown are designed accordingly for measuring tubes 2 with rectangular flow cross-section of the measuring section 8.

Figure 9:
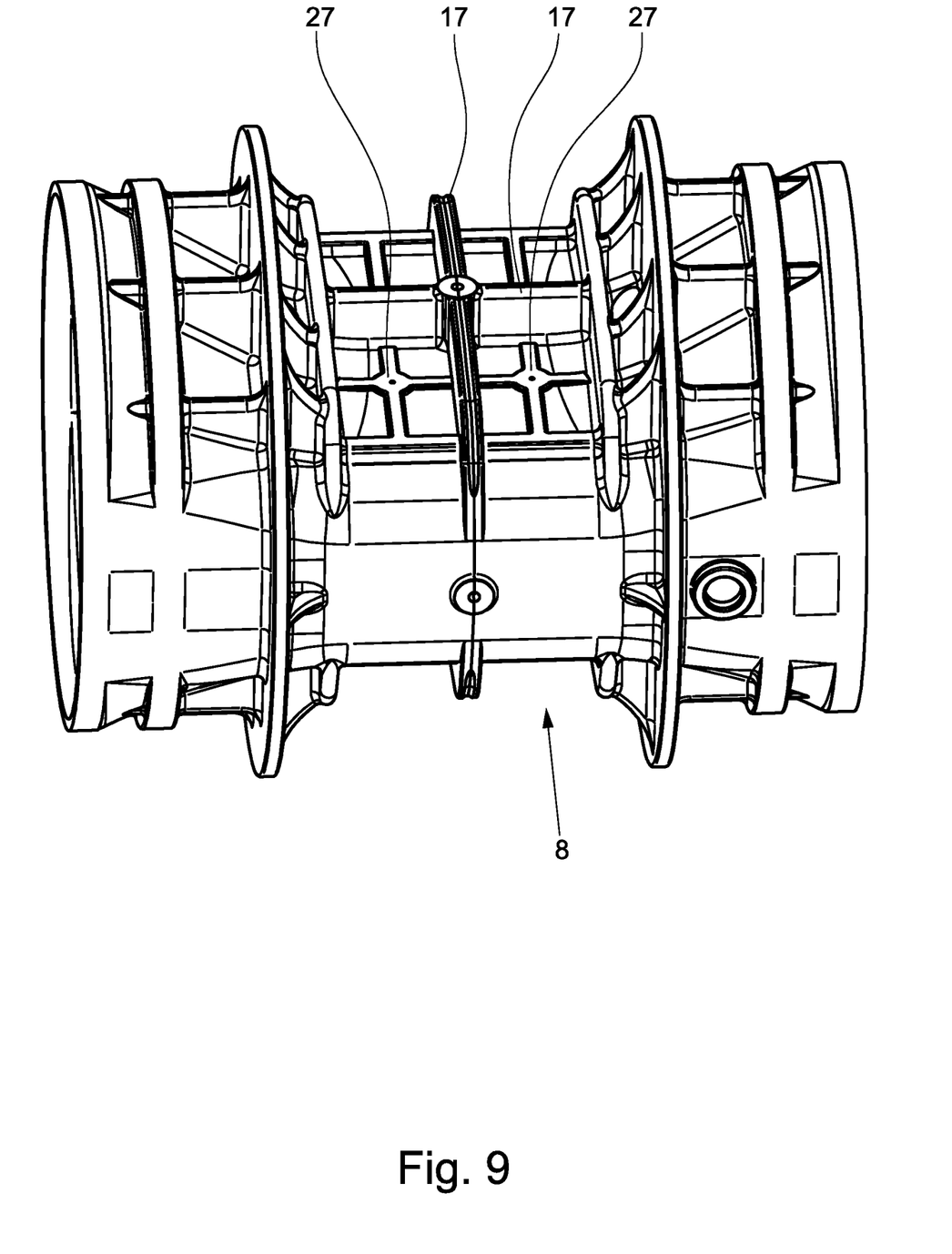
FIG. 9 shows a measuring tube of a magnetic-inductive flowmeter.

FIG. 9 shows an illustration of the measuring tube 2 of the magnetic-inductive flowmeter 1. Here the rectangular measuring section 8 that has the reinforcing ribs 17 can be seen particularly well, wherein the reinforcing ribs 17 are cross-shaped at the measuring section 8. In addition, fixing sections 27 for fixing the positioning elements 19 can also be seen. Preferably, these positioning elements 19 can be screwed into the measuring tube 2, for example, wherein the fixing sections 27 then have mating threads corresponding to threads formed on the positioning elements 19.

Figure 10:
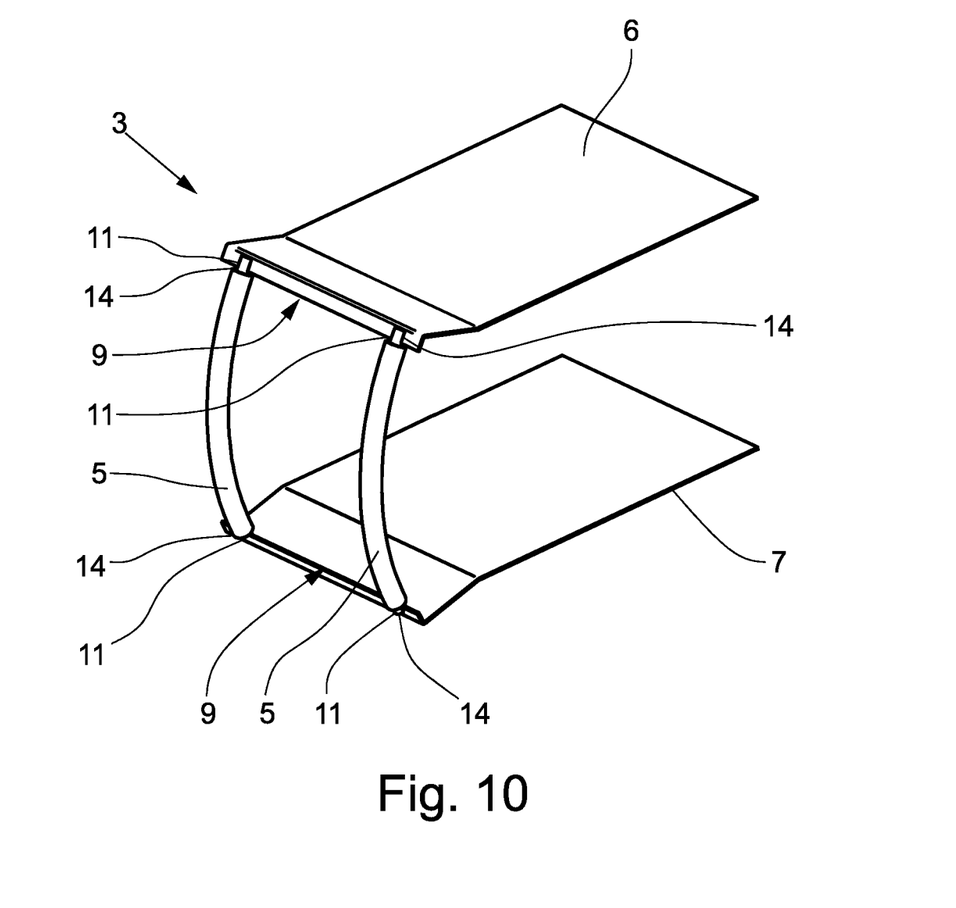
FIG. 10 shows a sixth embodiment of a magnetic circuit device.

FIG. 10 shows another illustration of a magnetic circuit device 3, which has two pole piece plates 6, 7 and two coils 5. The coils 5 are both located on the first side 9 of the pole piece plates 6, 7. In the example shown, the pole piece plates 6, 7 are designed so that they do not have any additional positioning recesses 20. Although not shown, the invention also includes all designs of the pole piece plates 6, 7 as described above in combination with the two coils arranged on the first side 9 of the pole piece plates 6, 7.

What is claimed is:

1. A magnetic-inductive flowmeter, comprising:
    a measuring tube for guiding an electrically conductive medium,
    a magnetic circuit device running outside the measuring tube for generating and guiding a magnetic field passing through the measuring tube at least partially perpendicular to the direction of flow of the medium, and
    two electrodes for tapping a measuring voltage induced in the medium,
    wherein the magnetic circuit device comprises at least a first coil for generating the magnetic field, a first pole piece plate and a second pole piece plate, the magnetic field being formed between the pole piece plates,
    wherein the measuring tube is arranged between the two pole piece plates, wherein the electrodes are arranged on opposite sides of the measuring tube and an imaginary connecting line between the two electrodes runs perpendicular to the direction of flow and perpendicular to the direction of the magnetic field,
    wherein each pole piece plate has a first side facing the first coil and a second side opposite the first side, and that, in order to feed the magnetic field into the pole piece plates, at least two feed-in regions per pole piece plate are each formed on the first sides of the pole piece plates
    wherein the coil is a long coil, having a length (l) at least ten times a diameter of the coil (d).

2. The magnetic-inductive flowmeter according to claim 1, wherein the feed-in regions are each formed in an outer quarter of a longitudinal extent of the first sides of the pole piece plates.

3. The magnetic-inductive flowmeter according to claim 1, wherein the first coil is arranged on a side of an electrode and is connected to the pole piece plates via Y-shaped yoke elements on each of the feed-in regions.

4. The magnetic-inductive flowmeter according to claim 1, wherein the magnetic circuit device has a second coil so that the magnetic field passing through the measuring tube is generated by two coils, wherein the second coil is arranged on a side of the pole piece plates opposite the first coil, so that the second sides of the pole piece plates face the second coil, and wherein, for feeding the magnetic field into the pole piece plates, at least two additional feed-in regions per pole piece plate are formed on the second sides of the pole piece plates.

5. The magnetic-inductive flowmeter according to claim 1, wherein the magnetic circuit device has a second coil, so that the magnetic field passing through the measuring tube is generated by two coils and wherein the second coil is arranged on the same side of the pole piece plates as the first coil.

6. The magnetic-inductive flowmeter according to claim 1, wherein the magnetic circuit device has four coils, so that the magnetic field passing through the measuring tube is generated by four coils, wherein two coils are arranged one behind the other on a side of each electrode, viewed in the direction of flow, and wherein each coil is connected at least indirectly via a feed-in region to the first pole piece plate and to the second pole piece plate, the two coils of each side being arranged parallel to one another, so that, viewed in the direction of flow, each electrode is arranged, in each case, between the coils of one side.

7. The magnetic-inductive flowmeter according to claim 6, wherein the coils are long coils, having a length (l) at least ten times a diameter of the coil (d), wherein the coils are arch-shaped, and wherein each coil is directly connected to the pole piece plates, each having a coil core connected to the pole piece plates.

8. The magnetic-inductive flowmeter according to claim 1, wherein the coil is arch-shaped.

9. The magnetic-inductive flowmeter according to claim 1, wherein the measuring tube has a rectangular measuring section, wherein the pole piece plates are arranged on longitudinal sides of the measuring section, wherein the measuring tube has reinforcing ribs, and wherein recesses for the reinforcing ribs are formed in the pole piece plates, which recesses correspond to the reinforcing ribs.

10. The magnetic-inductive flowmeter according to claim 1, wherein the measuring tube has positioning elements and positioning recesses for the positioning elements formed in the pole piece plates.

11. The magnetic-inductive flowmeter according to claim 1, wherein the first pole piece plate and the second pole piece plate are each formed from a first pole piece plate section and from a second pole piece plate section, wherein the first pole piece plate section of the first pole piece plate and the first pole piece plate section of the second pole piece plate are connected to one another via one or more coils and/or one or more yoke elements guiding magnetic fields, and wherein the second pole piece plate section of the first pole piece plate and the second pole piece plate section of the second pole piece plate are connected to one another via one or more coils and/or one or more yoke elements guiding magnetic fields, so that the magnetic circuit device is constructed in two parts overall.

12. A magnetic circuit device for generating and guiding a magnetic field in a magnetic-inductive flowmeter, comprising:
    at least one first coil for generating the magnetic field and a first pole piece plate and a second pole piece plate, the magnetic field being formed between the pole piece plates, space being provided between the pole piece plates for receiving a measuring tube,
    wherein each pole piece plate has a first side facing the first coil and a second side opposite the first side, and
    wherein at least two feed-in regions per pole piece plate are formed on the first side of each of the pole piece plates in order to feed the magnetic field into the pole piece plates
    wherein the coil is a long coil, having a length (l) at least ten times a diameter of the coil (d).

13. The magnetic circuit device according to claim 12, wherein the feed-in regions are each formed in an outer quarter of a longitudinal extent of the first sides of the pole piece plates.

14. The magnetic circuit device according to claim 12, wherein the at least one first coil is arranged on a side of an electrode and is connected to the pole piece plates via Y-shaped yoke elements on each of the feed-in regions.

15. The magnetic circuit device according to claim 12, wherein the magnetic circuit device has a second coil so that the magnetic field passing through the measuring tube is generated by two coils, wherein the second coil is arranged on the second side of the pole piece plates opposite the first coil, so that the second sides of the pole piece plates face the second coil, and wherein, for feeding the magnetic field into the pole piece plates, at least two additional feed-in regions per pole piece plate are formed on the second sides of the pole piece plates.

16. The magnetic circuit device according to claim 12, wherein the magnetic circuit device has a second coil, so that the magnetic field passing through the measuring tube is generated by two coils and wherein the second coil is arranged on the same side of the pole piece plates as the at least one first coil.

17. The magnetic circuit device according to claim 12, wherein the magnetic circuit device has four coils, so that the magnetic field passing through the measuring tube is generated by four coils, and two electrodes for tapping a measuring voltage induced in a medium flowing in the measuring tube, wherein two coils are arranged one behind the other on a side of each electrode, viewed in the direction of flow, and wherein each coil is connected at least indirectly via a feed-in region to the first pole piece plate and to the second pole piece plate, the two coils of each side being arranged parallel to one another, so that, viewed in the direction of flow, each electrode is arranged, in each case, between the coils of one side.

\* \* \* \* \*